(12) United States Patent
Linder (10) Patent No.: US 8,833,303 B1
(45) Date of Patent: Sep. 16, 2014

(54) PELLET DISPERSING BLADE ASSEMBLY

(71) Applicant: Roy D. Linder, Gibsland, LA (US)

(72) Inventor: Roy D. Linder, Gibsland, LA (US)

( * ) Notice: Subject to any disclaimer, the term of this patent is extended or adjusted under 35 U.S.C. 154(b) by 0 days.

(21) Appl. No.: 13/956,542

(22) Filed: Aug. 1, 2013

(51) Int. Cl.
*A01K 5/00* (2006.01)

(52) U.S. Cl.
USPC ..................................... 119/57.91

(58) Field of Classification Search
USPC ............... 119/57.91, 51.04, 57.1, 52.1, 57.92
See application file for complete search history.

(56) References Cited

U.S. PATENT DOCUMENTS

| | | | |
|---|---|---|---|
| 2,484,967 A | 10/1949 | Sodders | |
| 3,195,508 A | 7/1965 | Lehman et al. | |
| 3,613,641 A | 10/1971 | Geerlings | |
| 4,292,930 A | 10/1981 | Olsen | |
| 4,444,151 A | 4/1984 | Bohlmann | |
| 4,729,344 A | 3/1988 | Winkel | |
| 4,945,859 A | 8/1990 | Churchwell | |
| 5,143,289 A | 9/1992 | Gresham et al. | |
| 5,333,572 A | 8/1994 | Nutt | |
| 5,820,035 A | 10/1998 | Johnson et al. | |
| 7,252,049 B2 | 8/2007 | Ginsberg | |
| 7,404,376 B2 | 7/2008 | Hernandez | |

*Primary Examiner* — Yvonne Abbott
(74) *Attorney, Agent, or Firm* — R. Keith Harrison (57) ABSTRACT

A pellet dispersing blade assembly includes an assembly coupling; a pellet broadcasting blade drivingly engaged for rotation by the assembly coupling, the pellet broadcasting blade having a plurality of blade projections; and a pellet dispersing shall drivingly engaged for rotation by the assembly coupling. The pellet dispersing shaft may include a main shaft segment carried by the assembly coupling, a terminal shaft segment extending from the main shaft segment, the terminal shaft segment oriented at an angle relative to the main shaft segment and forming a terminal end of the pellet dispersing shaft and a single shaft bend between the main shaft segment and the terminal shaft segment.

18 Claims, 10 Drawing Sheets

PELLET DISPERSING BLADE ASSEMBLY

FIELD

Illustrative embodiments of the disclosure generally relate to wildlife feeders. More particularly, illustrative embodiments of the disclosure relate to a pellet dispersing blade assembly which breaks up or loosens clumped or aggregated feed pellets in a wildlife feeder for broadcasting of the feed pellets from the feeder.

BACKGROUND

Wildlife feeders are frequently used by hunters or observers of game such as deer to attract wildlife to a selected area for hunting or observation. A conventional wildlife feeder may include a generally cylindrical feed receptacle having a receptacle interior for containing feed pellets. The feed receptacle may be fitted with tripod legs which are adapted to support the feed receptacle above the ground. A funnel-shaped feed dispensing hopper extends from the bottom of the feed receptacle. A feed dispensing mechanism may include a timer which can be set to periodically dispense the feed pellets from the feed receptacle and feed dispensing hopper onto the ground at timed intervals.

Under some circumstances, the feed pellets may have a tendency to become clumped or aggregated in the feed receptacle and the feed dispensing hopper, particularly if bark, leaves and other extraneous material is present in the feed. Clumping of the feed pellets may hinder dispensing of the pellets from the wildlife feeder.

Accordingly, a pellet dispersing blade assembly which breaks up clumped or aggregated feed pellets in a wildlife feeder for dispensing or broadcasting of the feed pellets from the feeder may be desirable for some applications.

SUMMARY

Illustrative embodiments of the disclosure are generally directed to a pellet dispersing blade assembly. The pellet dispersing blade may include an assembly coupling; a pellet broadcasting blade drivingly engaged for rotation by the assembly coupling, the pallet broadcasting blade having a plurality of blade projections; and a pellet dispersing shaft drivingly engaged for rotation by the assembly coupling. The pellet dispersing shaft may include a main shaft segment carried by the assembly coupling, a terminal shaft segment extending from the main shaft segment, the terminal shaft segment oriented at an angle relative to the main shaft segment and forming a terminal end of the pellet dispersing shaft and a single shaft bend between the main shaft segment and the terminal shaft segment.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention, which is defined by the claims. Furthermore, there is no intention to be bound by any expressed or implied theory presented in the preceding technical field, background, brief summary or the following detailed description. Relative terms such as "upper" and "lower" are used for descriptive purposes herein and indicate the positions of the various components of the assembly relative to each other. Thus, such relative terms are not intended to be construed in a limiting sense.

Figure 1:
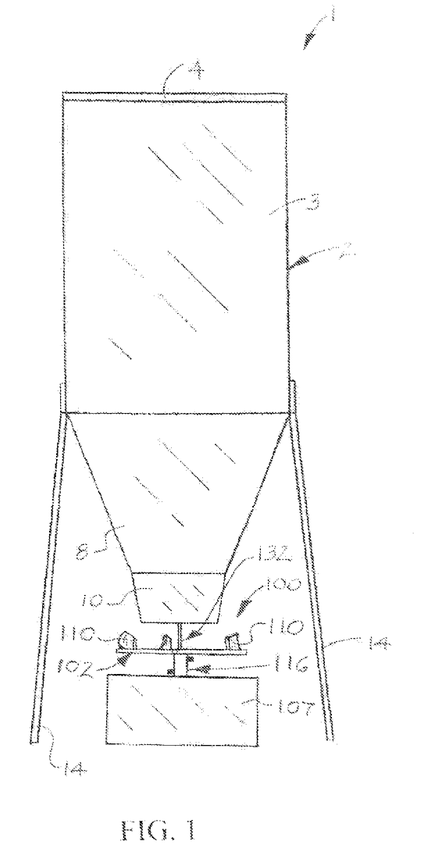
FIG. 1 is a side view of an exemplary wildlife feeder fitted with an illustrative embodiment of the pellet dispersing blade assembly.
Figure 2:
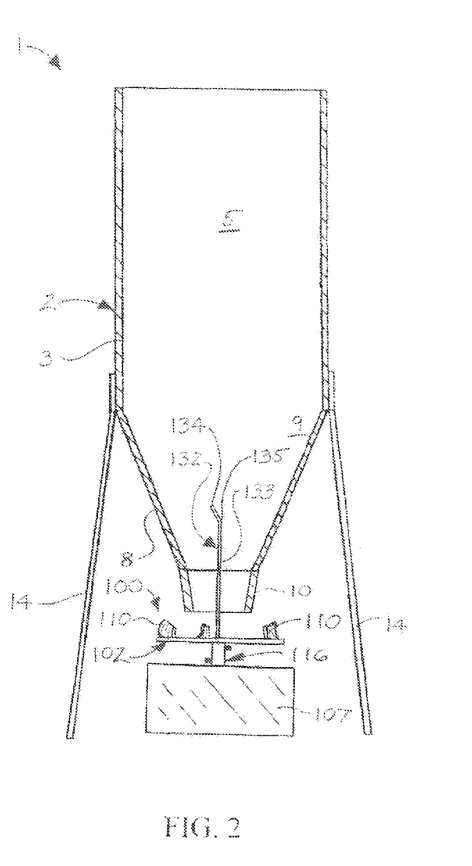
FIG. 2 is a longitudinal sectional view of the exemplary wildlife feeder illustrated in FIG. 1.

Referring initially to FIGS. 1-8B of the drawings, an illustrative embodiment of the pellet dispersing blade assembly, hereinafter assembly, is generally indicated by reference numeral 100. As will be hereinafter described, in some applications the assembly 100 may be a component part of a wildlife feeder 1, which may have a conventional design. As illustrated in FIGS. 1 and 2, an exemplary wildlife feeder 1 which is suitable for implementation of the assembly 100 may include a feed receptacle 2. The feed receptacle 2 has a receptacle wall 3 which may have a generally elongated, cylindrical shape and forms a receptacle interior 5. A removable receptacle lid 4 (FIG. 1) may be placed on the feed receptacle 2 to close the receptacle interior 5.

A generally funnel-shaped feed dispensing hopper 8 may extend downwardly from the receptacle wall 3 of the feed receptacle 2. The feed dispensing hopper 8 has a dispensing hopper interior 9 which communicates with the receptacle interior 5 of the feed receptacle 2. A hopper tip 10 may extend downwardly from the feed dispensing hopper 8. Multiple feeder legs 14 may extend from the receptacle wall 3 of the feed receptacle 2 to support the feed receptacle 2 above the ground or other support surface (not illustrated).

A base 107 which contains an assembly drive motor 101 (FIG. 10) may be provided beneath the feed dispensing hopper 8 of the feed receptacle 2. The drive motor 101 may be conventional and drivingly engages the assembly 100 typically through a motor shaft 108 (FIG. 5) for rotation of the assembly 100 in a manner which will be hereinafter described. A timer (not illustrated) may interface with the drive motor 101 to operate the drive motor 101 for rotation of the assembly 100 at preselected programmed time intervals, typically in the conventional manner. It will be recognized and understood by those skilled in the art that the foregoing description of the wildlife feeder 1 is exemplary only, and that the assembly 100 may be equally adaptable for use with wildlife feeders having any of a variety of alternative designs known by those skilled in the art.

Figure 3:
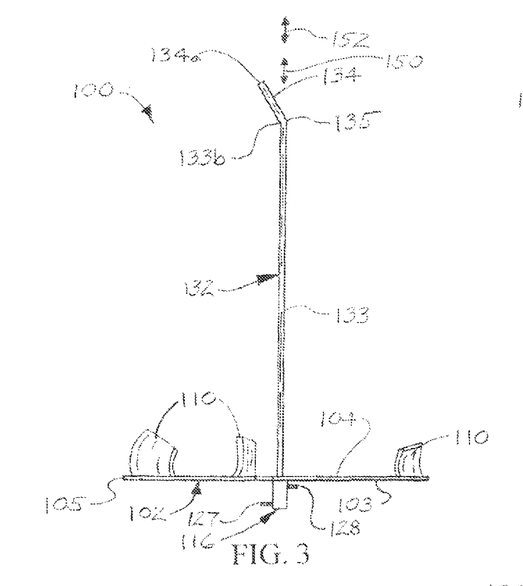
FIG. 3 is a side view of an illustrative pellet dispersing blade assembly.
Figures 4, 4B:
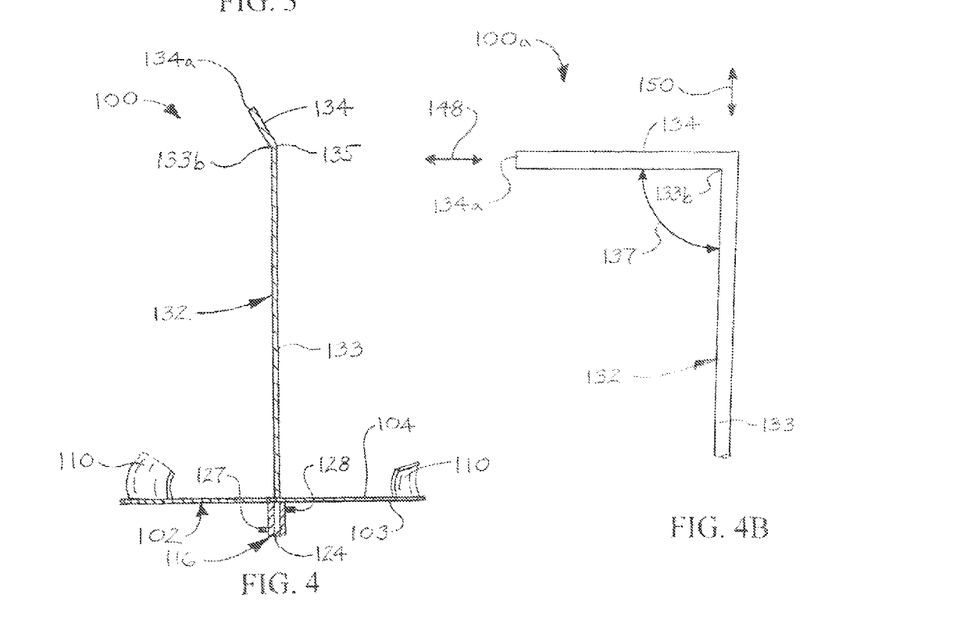
FIG. 4 is a longitudinal sectional view of the illustrative pellet dispersing blade assembly illustrated in FIG. 3.
FIG. 4B is an enlarged side view of an end segment of an exemplary pellet dispersing shaft of an alternative illustrative pellet dispersing blade assembly, with the terminal shaft segment disposed at a right angle with respect to the main shaft segment of the pellet dispersing shaft.
Figure 5:
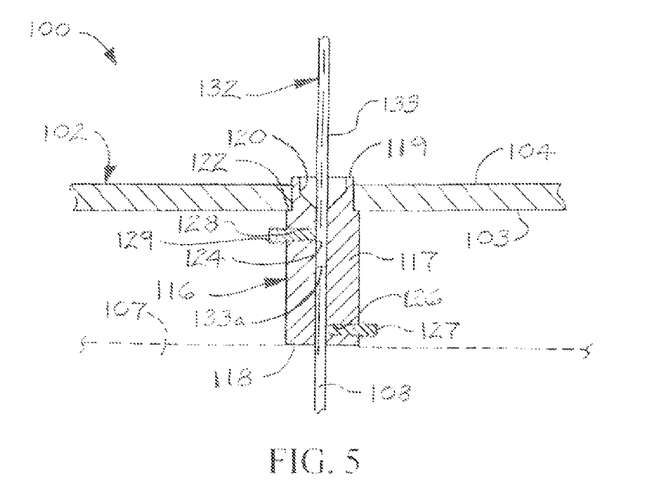
FIG. 5 is a longitudinal sectional view of an exemplary blade coupling which is suitable for coupling the pellet dispersing blade assembly to a motor shaft (partially in section) of an illustrative pellet dispersing blade assembly.

As illustrated in FIGS. 3-5, the assembly 100 may include an assembly coupling 116. The assembly coupling 116 may be drivingly coupled to the motor shaft 108 (FIG. 5) of the drive motor 101 (FIG. 10) for rotation by operation of the drive motor 101 in a manner which will be hereinafter described. A pellet broadcasting blade 102 is drivingly coupled to the assembly coupling 116 for rotation thereby such as in a manner which will be hereinafter described. A flexible pellet dispersing shaft 132 is drivingly coupled to the assembly coupling 116 for rotation thereby for purposes which will be hereinafter described. The assembly coupling 116 and the pellet broadcasting blade 102 may each be metal such as aluminum or may be carbon fiber composite, a rigid and durable plastic and/or other material which is consistent with the functional requirements of the assembly 100. The pellet dispersing shaft 132 may be flexible metal such as aluminum or other flexible and rigid or semi-rigid material.

As illustrated in FIG. 5, the assembly coupling 116 of the assembly 100 may include a coupling body 117. In some embodiments, the coupling body 117 of the assembly coupling 116 may be generally elongated and cylindrical in shape. The coupling body 117 may have a generally flat or planar lower coupling body end 118 and a generally flat or planar upper coupling body end 119. A shaft accommodation cavity 120 may extend into the upper coupling body end 119.

Figure 6:
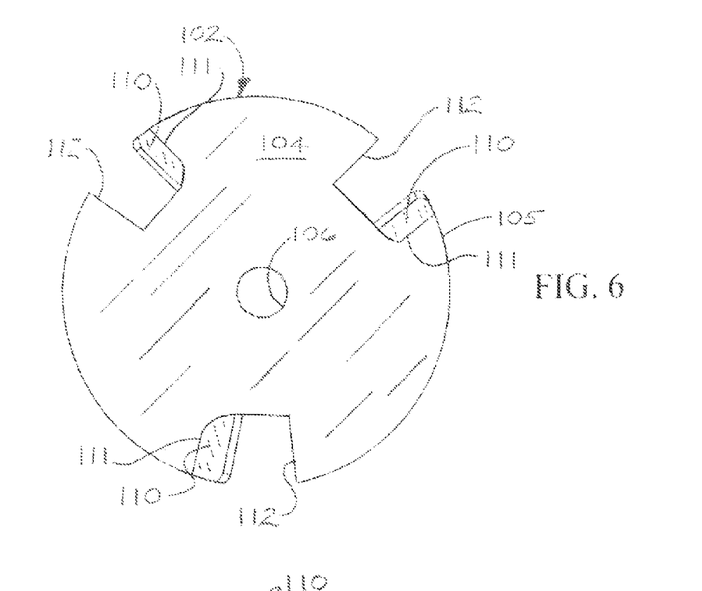
FIG. 6 is a top view of an exemplary pellet broadcasting blade of an illustrative pellet dispersing blade assembly.

The pellet broadcasting blade 102 of the assembly 100 may be generally flat and circular with a flat or planar lower blade surface 103, a flat or planar upper blade surface 104 and a circular outer blade edge 105 (FIG. 6). Multiple blade projections 110 extend from the upper blade surface 104 of the pellet broadcasting blade 102. The blade projections 110 may be disposed adjacent to the outer blade edge 105 in spaced-apart relationship to each other around the circumference of the pellet broadcasting blade 102. As illustrated in FIG. 6, in some embodiments, three blade projections 110 may protrude from the upper blade surface 104 of the pellet broadcasting blade 102 at substantially equally spaced-apart intervals to each other around the circumference of the pellet broadcasting blade 102. In other embodiments, a lesser or greater number of the blade projections 110 may protrude from the upper blade surface 104.

Figure 7:
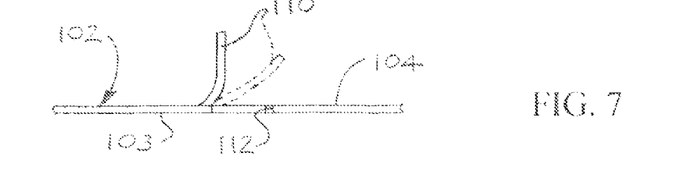
FIG. 7 is a side view of a portion of the exemplary pellet broadcasting blade, more particularly illustrating alternative positions of a blade projection extending from the blade.

In some embodiments, each blade projection 110 may be cut from the pellet broadcasting blade 102, forming a blade projection notch 112 which extends into the outer blade edge 105 adjacent to the blade projection 110 and toward the geometric center of the pellet broadcasting blade 102. Each blade projection 110 may bend upward along a bend line 111 and protrude beyond the upper blade surface 104 of the pellet broadcasting blade 102. As illustrated in FIG. 7, in some embodiments, each blade projection 110 can be selectively bended or positioned at a steep angle (illustrated in solid lines) or a shallow angle (illustrated in the phantom lines) relative to the plane of the upper blade surface 104 for purposes which will be hereinafter described. It will be recognized and understood by those skilled in the art that the foregoing description of the pellet broadcasting blade 102 is exemplary only and that the assembly 100 may have pellet broadcasting blades with any of a variety of alternative designs which are known by those skilled in the art and consistent with the functional requirements of the pellet dispensing blade 102.

The pellet broadcasting blade 102 may be drivingly engaged by the assembly coupling 116 according to any technique which is known by those skilled in the art and suitable for the purpose. In some embodiments, a coupling opening 106 (FIG. 6) may extend through the geometric center of the pellet broadcasting blade 102. A blade seat 122 (FIG. 5) may circumscribe the coupling body 117 generally beneath the upper coupling body end 119. The coupling opening 106 in the pellet broadcasting blade 102 may accommodate the coupling body 117 of the assembly coupling 116 in an interference fit. It will be recognized and understood by those skilled in the art that the manner of attachment of the pellet broadcasting blade 102 to the assembly coupling 116 as was heretofore described with respect to FIG. 5 is exemplary only and that the pellet broadcasting blade 102 may be drivingly engaged by the assembly coupling 116 according to any technique which is known by those skilled in the art and suitable for the purpose. For example and without limitation, in various embodiments the pellet broadcasting blade 102 may be attached to the assembly coupling 116 using mechanical fasteners (not illustrated) suitable for the purpose. In other embodiments, the pellet broadcasting blade 102 may be welded, molded, casted and/or otherwise fabricated in one piece with the assembly coupling 116 according to the knowledge of those skilled in the art.

Figure 4A:
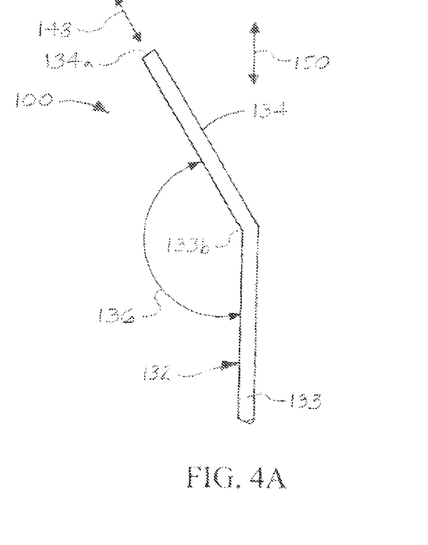
FIG. 4A is an enlarged side view of an end segment of an exemplary pellet dispersing shaft of an illustrative pellet dispersing blade assembly, with a terminal shaft segment disposed at an obtuse angle with respect to a main shaft segment of the pellet dispersing shaft.

As further illustrated in FIGS. 3-4B, the pellet dispersing shaft 132 of the assembly 100 may include a generally elongated main shaft segment 133. The main shaft segment 133 has a lower shaft segment end 133a (FIG. 5) which may be drivingly engaged for rotation by the assembly coupling 116 in a manner which will be hereinafter described. A terminal shaft segment 134 terminates an upper shaft segment end 133b of the main shaft segment 133 at a single shaft bend 135. As illustrated in FIG. 4A, in some embodiments of the assembly 100, a longitudinal axis 148 of the terminal shaft segment 134 may be disposed at an obtuse angle 136 relative to a longitudinal axis 150 of the main shaft segment 133. As illustrated in FIG. 4B, in other embodiments of the assembly 100a, the longitudinal axis 148 of the terminal shaft segment 134 may be disposed at a right angle 137 relative to the longitudinal axis 150 of the pellet dispersing shaft 132. The terminal shaft segment 134 forms a terminal end of the pellet dispensing shaft 134a. As illustrated in FIGS. 3 and 4, the upper blade surface 104 of the pellet broadcasting blade 102 faces the terminal shaft segment 134 of the pellet dispersing shaft 132.

The motor shaft 108 which is drivingly engaged by the assembly drive motor 101 (FIG. 10) may drivingly engage the assembly coupling 116 of the assembly 100 for rotation according to any technique or mechanism which is known by those skilled in the art and suitable for the purpose. As illustrated in FIG. 5, in some embodiments, at least one shaft bore 124 may be provided in the coupling body 117 of the assembly coupling 116. In some embodiments, the shaft bore 124 may traverse the coupling body 117 from the lower coupling body end 118 to the upper coupling body end 119, as illustrated. The upper end of the motor shaft 108 may be inserted in the shaft bore 124 at the lower body end 118. In some embodiments, a motor shaft set screw 127 may be threaded through a radial motor shaft set screw opening 126 which communicates with the shaft bore 124 generally above and adjacent to the lower body end 118 of the coupling body 117. The motor shaft set screw 127 may engage the motor shaft 108 to secure the motor shaft 108 in the shaft bore 124. In other embodiments, the motor shaft 108 may be fixedly or releasably secured in the shaft bore 124 using alternative securing techniques which are suitable for the purpose.

The assembly coupling 116 may drivingly engage the lower shaft segment end 133a of the main shaft segment 133 of the pellet dispersing shaft 132 according to any technique or mechanism which is known by those skilled in the art and suitable for the purpose. In some embodiments, the lower shaft segment end 133a of the main shaft segment 133 may be inserted in the shaft bore 124 at the upper body end 119 of the coupling body 117 with the main shaft segment 133 protruding through the shaft accommodation cavity 120. A dispersing shaft set screw 129 may be threaded through a radial dispersing shaft set screw opening 128 which communicates with the shaft bore 124 generally below and adjacent to the upper body end 119 of the coupling body 117. The dispersing shaft set screw 129 may engage the main shaft segment 133 of the pellet dispersing shaft 132 to secure the pellet dispersing shaft 132 in the shaft bore 124. In other embodiments, the main shaft segment 133 of the pellet dispersing shaft 132 may be fixedly or releasably secured in the shaft bore 124 using alternative securing techniques which are suitable for the purpose.

Figure 8:
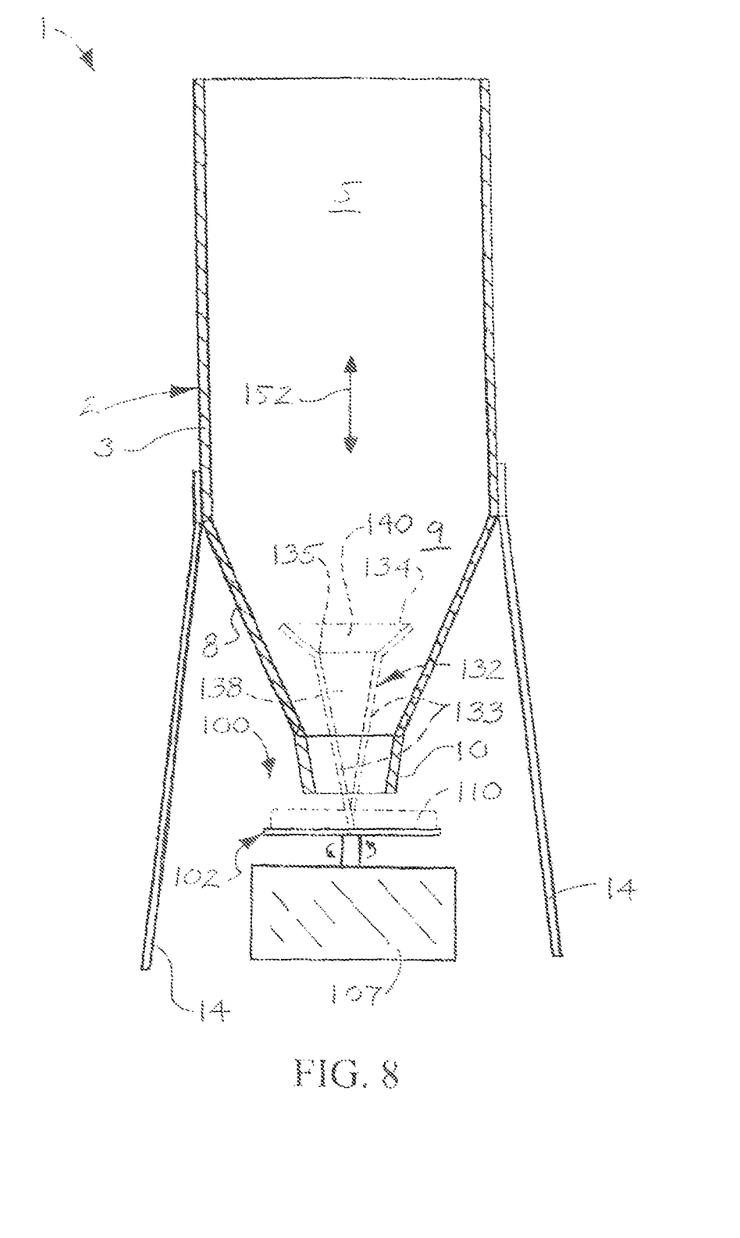
FIG. 8 is a longitudinal sectional view of an exemplary wildlife feeder fitted with an illustrative pellet dispersing blade assembly, more particularly illustrating rotation of the pellet dispersing blade assembly by operation of an assembly drive motor in exemplary application of the assembly.
Figure 8A:
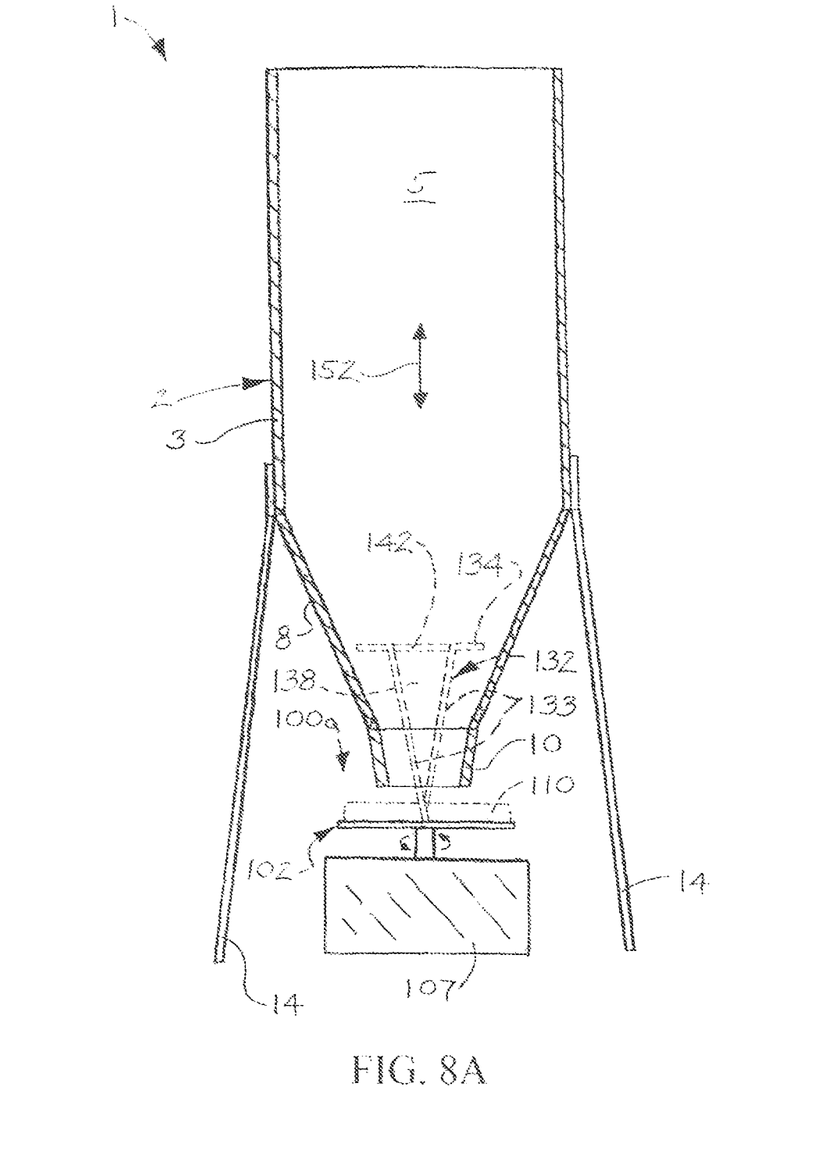
FIG. 8A is a longitudinal sectional view of an exemplary wildlife feeder fitted with an alternative illustrative embodiment of the pellet dispersing blade assembly, more particularly illustrating rotation of the pellet dispersing blade assembly by operation of an assembly drive motor in exemplary application of the assembly.
Figure 8B:
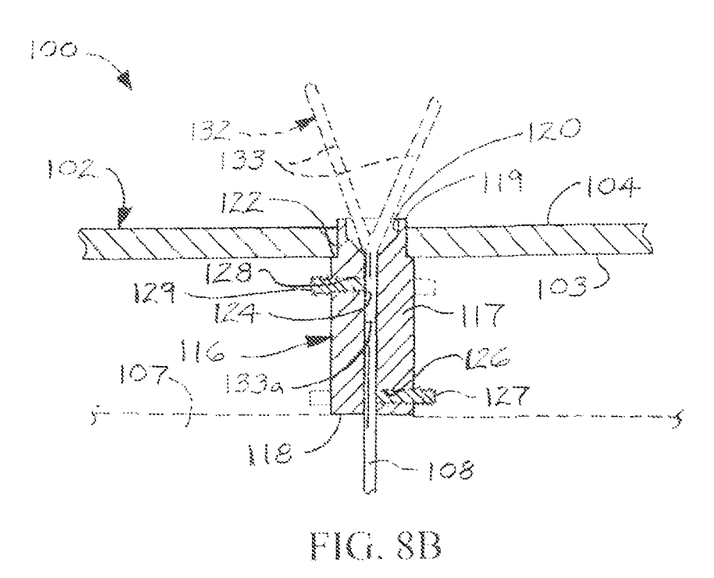
FIG. 8B is a longitudinal sectional view of an exemplary assembly coupling, with the pellet dispersing shaft distorted in a funnel trajectory and a shaft accommodation cavity in the coupling accommodating the pellet dispersing shaft during rotation of the assembly coupling.

As illustrated in FIG. 3, when the assembly 100 is stationary (not rotating), the longitudinal axis 150 of the main shaft segment 133 of the pellet dispensing shaft 132 coincides with a center axis of rotation 152 of the pellet dispersing shaft 132. As illustrated in FIGS. 8-8B, operation of the assembly drive motor 101 (FIG. 10) facilitates rotation of the pellet broadcasting blade 102 and the pellet dispersing shaft 132 of the assembly 100 through the assembly coupling 116. The terminal shaft segment 134, disposed at an obtuse angle 136 (FIG. 4A) or a right angle (FIG. 4B) with respect to the main shaft segment 133 of the pellet dispersing shaft 132, imparts centrifugal force to the main shaft segment 133, causing the main shaft segment 133 to spread outwardly. Accordingly, as the pellet dispersing shaft 132 rotates about the center axis of rotation 152 (FIGS. 8 and 8A), the main shaft segment 133 forms a lower funnel pattern 138 around the center axis of rotation 152 whereas the terminal shaft segment 134 forms an upper funnel pattern 140 around the center axis of rotation 152. As illustrated in FIG. 8A, in the assembly 100a, the terminal shaft segment 134 forms an annulus pattern 142 around the center axis of rotation 152. As illustrated in FIG. 8B, the shaft accommodation cavity 120 in the upper coupling body end 119 of the coupling body 117 accommodates the main shaft segment 133 as it spreads outwardly into the inverted cone-shaped lower funnel pattern 138 and angles from the center axis of rotation 152.

Figure 9:
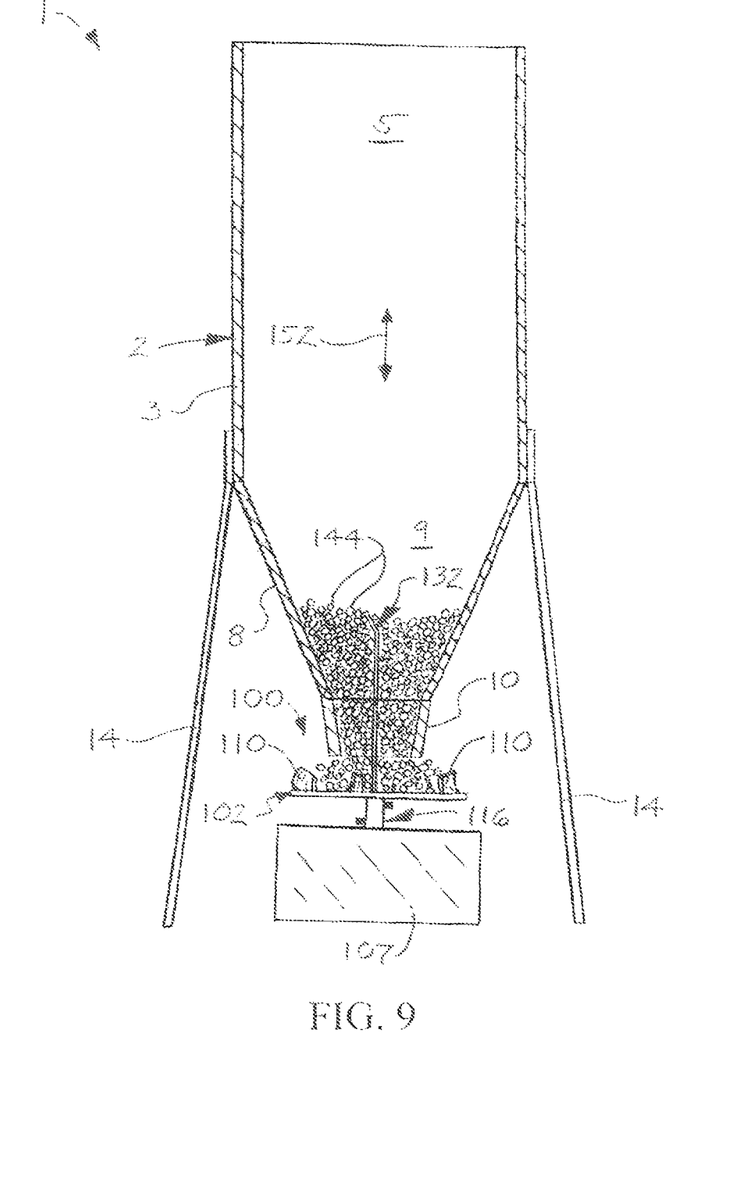
FIG. 9 is a side view of an exemplary wildlife feeder fitted with an illustrative embodiment of the pellet dispersing blade assembly, with a supply of feed pellets placed in the wildlife feeder preparatory to operation.
Figure 10:
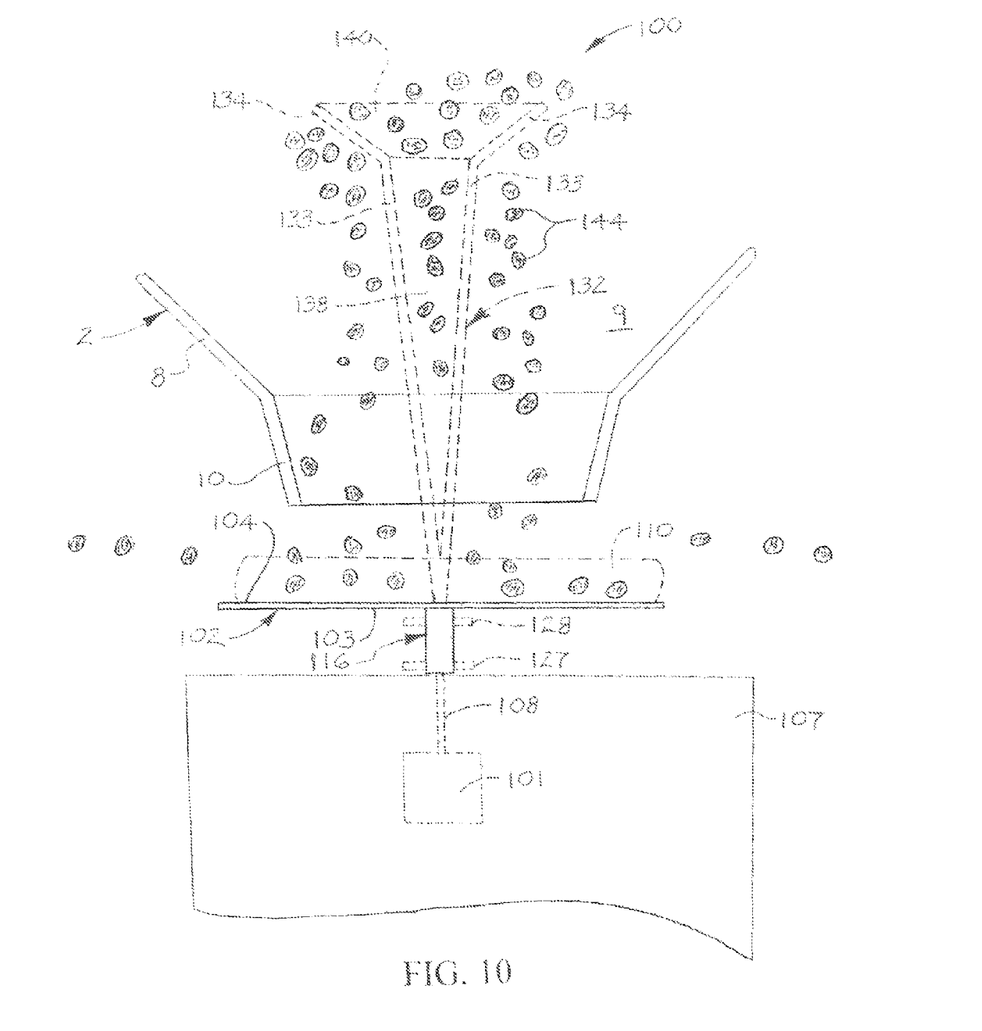
FIG. 10 is a side view of an illustrative pellet dispersing blade assembly in rotation of the assembly as the rotating assembly breaks up, separates or loosens clumped feed pellets in the wildlife feeder and the loosened feed pellets fall from the wildlife feeder onto the rotating underlying pellet broadcasting blade of the assembly.
Figure 11:
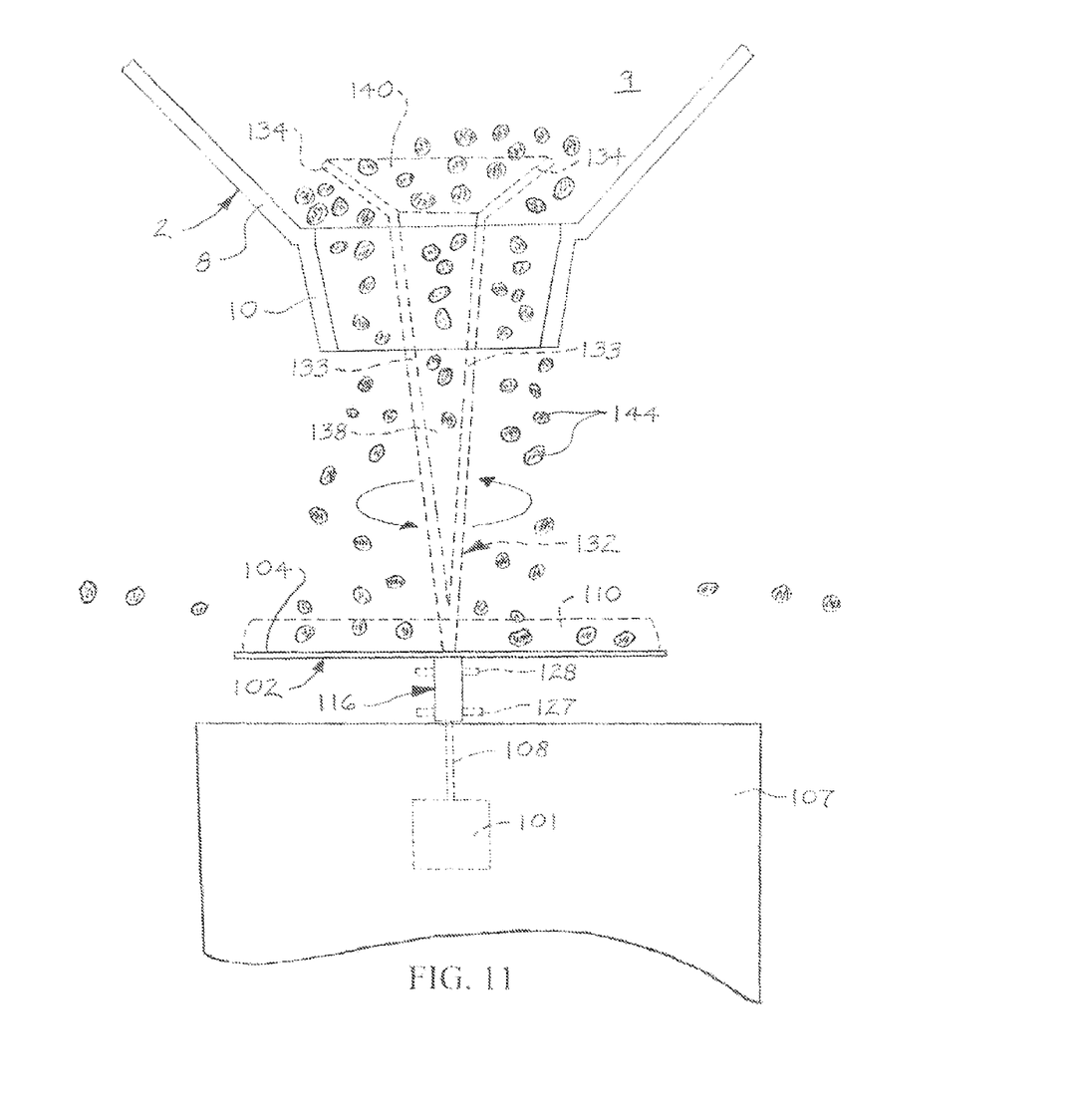
FIG. 11 is a side view of the rotating pellet dispersing blade assembly, more particularly illustrating an alternative lower position of the assembly with respect to the wildlife feeder.

Referring next to FIGS. 9-13A of the drawings, in exemplary application of the assembly 100, the pellet dispensing shaft 132 extends upwardly through the hopper tip 10 and into the dispensing hopper interior 9 in the feed dispensing hopper 8 of the feed receptacle 2. As illustrated in FIGS. 9 and 10, in some applications, the height of the feed receptacle 2 and/or the assembly 100 can be selected to position the terminal shaft segment 134 at a selected height or vertical position within the dispensing hopper interior 9 of the feed dispensing hopper 8 or the receptacle interior 5 of the feed receptacle 2. A supply of feed pellets 144 is placed in the dispensing hopper interior 9 of the feed dispensing hopper 8. Under some circumstances, the feed pellets 144 may be clumped or aggregated together particularly in the event that bark, leaves and other extraneous material is present in the supply of feed pellets 144.

Operation of the assembly drive motor 101 causes rotation of the assembly coupling 116, the pellet broadcasting blade 102 and the pellet dispersing shaft 132 of the assembly 100 at a selected rotational speed. In some applications, the operational speed of the assembly drive motor 101 may be selected such that the assembly 100 rotates a speed of at least about 10,000 rpm. Accordingly, the terminal shaft segment 134 of the pellet dispersing shaft 132 imparts centrifugal force to the pellet dispensing shaft 132, causing the main shaft segment 133 to spread outwardly into the lower funnel pattern 138. The terminal shaft segment 134 spreads outwardly into the upper funnel pattern 140 (FIG. 8) or the annulus pattern 142 (FIG. 8A). Therefore, the pellet dispersing shaft 132 breaks up the clumped or aggregated feed pellets 144, enabling the loosened feed pellets 144 to fall freely from the dispensing hopper interior 9 through the hopper tip 10 onto the rotating underlying pellet broadcasting blade 102. It will be appreciated by those skilled in the art that the spread configuration of the rotating main shaft segment 133 and terminal shaft segment 134 enables the pellet dispersing shaft 132 to contact and break up or loosen a large quantity or volume of the feed pellets 144 in the feed receptacle 2, particularly the feed pellets 144 in the hopper tip 10 and the dispensing hopper interior 9 of the feed dispensing hopper 8. Upon subsequent termination of operation of the assembly drive motor 101, the pellet dispersing shaft 132 stops rotating about the center axis of rotation 152 (FIG. 8) and the main shaft segment 133 of the pellet dispersing shaft 132 recoils to the vertical position in alignment with the center axis of rotation 152, as illustrated in FIG 9.

Figures 12, 12A:
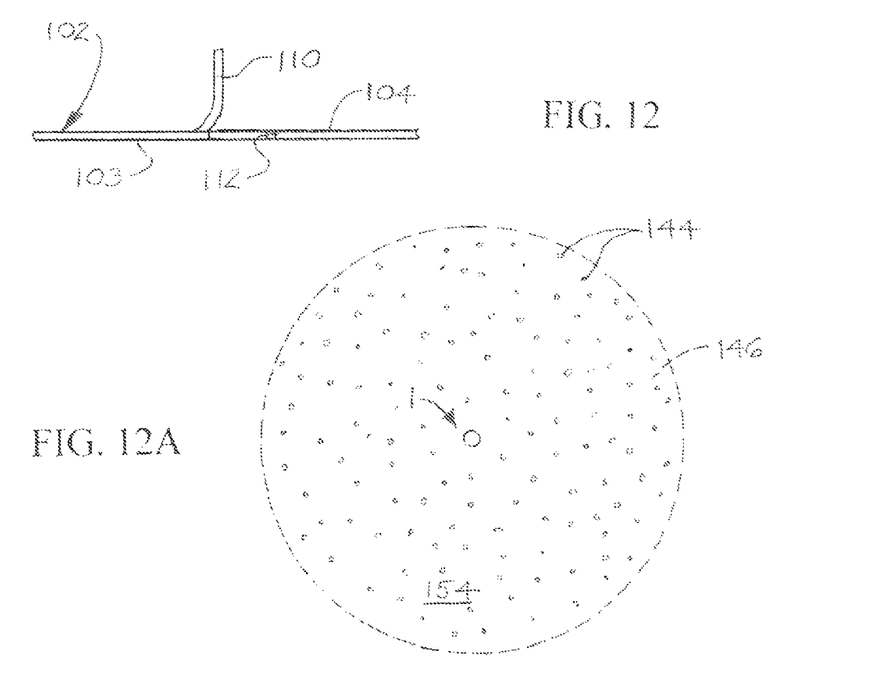
FIG. 12 is a side view of a portion of an exemplary pellet broadcasting blade of the illustrative pellet dispersing blade assembly, more particularly illustrating a steep angled position of a blade projection extending from the blade.
FIG. 12A is a top view of the wildlife feeder and more particularly illustrating a feed broadcast area having a size which corresponds to a pellet broadcasting blade having the steep angled position of the blade projection illustrated in FIG. 12.
Figure 13:
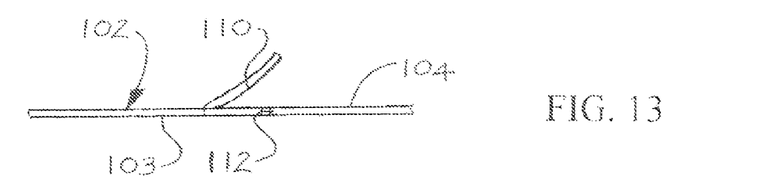
FIG. 13 is a side view of a portion of an exemplary pellet broadcasting blade of the illustrative pellet dispersing blade assembly, more particularly illustrating a shallow angled position of the blade projection extending from the blade.
Figure 13A:
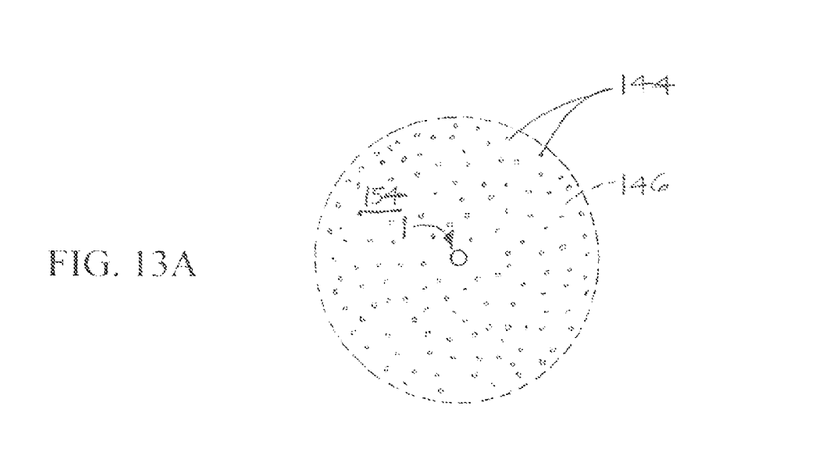
FIG. 13A is a top view of the illustrative pellet dispersing blade assembly and more particularly illustrating a feed broadcast area having a size which corresponds to a pellet broadcasting blade having the shallow angled position of the blade projection illustrated in FIG. 13.

As the loosened feed pellets 144 fall from the dispensing hopper interior 9 through the hopper tip 10 and onto the underlying rotating pellet broadcasting blade 102, the blade projections 110 of the pellet broadcasting blade 102 strike and broadcast the feed pellets 144 outwardly from the assembly 100 onto the ground 154 (FIGS. 12A and 13A) in a circular feed broadcast area 146. It will be appreciated by those skilled in the art that the angle of each blade projection 110 relative to the plane of the upper blade surface 104 of the pellet broadcasting blade 102 can be selected according to the desired size or area of the feed broadcast area 146. As illustrated in FIG. 12, for a larger feed broadcast area 146 (FIG. 12A), each blade projection 110 can be oriented at a steep angle (such as perpendicular relationship) to the upper blade surface 104. Thus, the feed pellets 144 may be broadcast from the wildlife feeder 1 in a feed broadcast area 146 having a diameter of 60 feet or more. Conversely, as illustrated in FIG. 13, for a smaller feed broadcast area 146 (FIG. 13A), each blade projection 110 can be oriented at a shallow angle to the upper blade surface 104. Thus, the feed pellets 144 may be broadcast from the wildlife feeder 1 in a feed broadcast area 146 having a diameter of 40 feet or less. In some applications, a timer (not illustrated) which interfaces with the assembly drive motor 101 may be set to operate the assembly drive motor 101 at selected times and for selected periods of time according to the desired quantity of feed pellets 144 which is to be dispensed from the wildlife feeder 1, as is known by those skilled in the art.

While various illustrative embodiments have been described above, it will be recognized and understood that various modifications can be made and the appended claims are intended to cover all such modifications which may fall within the spirit and scope of the disclosure.

What is claimed is:

1. A pellet dispersing blade assembly, comprising:
   an assembly coupling;
   a blade seat in the assembly coupling;
   a pellet broadcasting blade drivingly engaged for rotation by the assembly coupling, the pellet broadcasting blade having a plurality of blade projections, the pellet broadcasting blade including a first blade surface and a second blade surface opposite the first blade surface, the second blade surface facing the terminal shaft segment of the pellet dispersing shaft, and wherein the plurality of blade projections protrudes beyond the second blade surface and the first blade surface of the pellet broadcasting blade seats against the blade seat; and
   a pellet dispersing shaft drivingly engaged for rotation by the assembly coupling, the pellet dispersing shaft including:
      a main shaft segment carried by the assembly coupling;
      a terminal shaft segment extending from the main shaft segment, the terminal shaft segment oriented at an angle relative to the main shaft segment and forming a terminal end of the pellet dispersing shaft; and
      a single shaft bend between the main shaft segment and the terminal shaft segment.

2. The pellet dispersing blade assembly of claim 1 further comprising a plurality of blade projection notches in the pellet broadcasting blade, the plurality of blade notches adjacent to the plurality of blade projections, respectively.

3. The pellet dispersing blade assembly of claim 2 wherein each of the plurality of blade projections is positional at a selected angle relative to the second blade surface of the pellet broadcasting blade.

4. The pellet dispersing blade assembly of claim 1 wherein the assembly coupling comprises a coupling body and at least one shaft bore in the coupling body, and wherein the shaft bore accommodates the main shaft segment of the pellet dispersing shaft.

5. The pellet dispersing blade assembly of claim 1 wherein the terminal shaft segment is oriented at an obtuse angle relative to the main shaft segment.

6. The pellet dispersing blade assembly of claim 1 wherein the terminal shaft segment is oriented at a perpendicular angle relative to the main shaft segment.

7. A pellet dispersing blade assembly, comprising:
   an assembly coupling;
   a pellet broadcasting blade drivingly engaged for rotation by the assembly coupling, the pellet broadcasting blade having a plurality of blade projections;
   a pellet dispersing shaft drivingly engaged for rotation by the assembly coupling, the pellet dispersing shaft having a center axis of rotation and including:
      a main shaft segment carried by the assembly coupling;
      a terminal shaft segment extending from the main shaft segment, the terminal shaft segment oriented at an angle relative to the main shaft segment and forming a terminal end of the pellet dispersing shaft; and
      a single shaft bend between the main shaft segment and the terminal shaft segment;
   wherein the main shaft segment has a longitudinal axis coinciding with the center axis of rotation of the pellet dispensing shaft when the pellet dispersing shaft is stationary; and
   wherein the main shaft segment forms a funnel pattern around the center axis of rotation responsive to rotation of the pellet dispersing shaft.

8. The pellet dispersing blade assembly of claim 7 wherein the pellet broadcasting blade comprises a first blade surface and a second blade surface opposite the first blade surface, the second blade surface facing the terminal shaft segment of the pellet dispensing shaft, and wherein the plurality of blade projections protrudes beyond the second blade surface.

9. The pellet dispersing blade assembly of claim 8 further comprising a plurality of blade projection notches in the pellet broadcasting blade, the plurality of blade notches adjacent to the plurality of blade projections, respectively.

10. The pellet dispersing blade assembly of claim 9 wherein each of the plurality of blade projections is positional at a selected angle relative to the second blade surface of the pellet broadcasting blade.

11. The pellet dispersing blade assembly of claim 8 further comprising a blade seat in the assembly coupling, and wherein the first blade surface of the pellet broadcasting blade seats against the blade seat.

12. The pellet dispersing blade assembly of claim 7 wherein the assembly coupling comprises a coupling body and at least one shaft bore in the coupling body, and wherein the shaft bore accommodates the main shaft segment of the pellet dispersing shaft.

13. The pellet dispersing blade assembly of claim 7 wherein the terminal shaft segment is oriented at an obtuse angle relative to the main shaft segment.

14. The pellet dispersing blade assembly of claim 7 wherein the terminal shaft segment is oriented at a perpendicular angle relative to the main shaft segment.

15. A pellet dispersing blade assembly, comprising:
an assembly coupling including:
   a coupling body having a first coupling body end and a second coupling body end opposite the first coupling body end; and
   a shaft accommodation cavity in the second coupling body end;
a pellet broadcasting blade drivingly engaged for rotation by the assembly coupling, the pellet broadcasting blade having a first blade surface, a second blade surface opposite the first blade surface and a plurality of blade projections protruding beyond the second blade surface;
a pellet dispersing shaft drivingly engaged for rotation by the assembly coupling, the pellet dispersing shaft having a center axis of rotation and including:
   a main shaft segment carried by the coupling body of the assembly coupling, the main shaft segment protruding through the shaft accommodation cavity,
   a terminal shaft segment extending from the main shaft segment, the terminal shaft segment oriented at an angle relative to the main shaft segment and forming a terminal end of the pellet dispersing shaft; and
   a single shaft bend between the main shaft segment and the terminal shaft segment;
wherein the main shaft segment has a longitudinal axis coinciding with the center axis of rotation of the pellet dispensing shaft when the pellet dispersing shift is stationary;
wherein the main shaft segment forms a funnel pattern around the center axis of rotation responsive to rotation of the pellet dispersing shaft; and
wherein the terminal shaft segment forms a funnel pattern around the center axis of rotation responsive to rotation of the pellet dispersing shaft.

16. The pellet dispersing blade assembly of claim 15 wherein the terminal shaft segment is oriented at an obtuse angle relative to the main shaft segment.

17. The pellet dispersing blade assembly of claim 15 wherein the terminal shaft segment is oriented at a perpendicular angle relative to the main shaft segment.

18. The pellet dispersing blade assembly of claim 15 further comprising at least one shaft bore in the coupling body, and wherein the shaft bore accommodates the main shaft segment of the pellet dispersing shaft.

* * * * *